United States Patent
Hara et al.

(10) Patent No.: US 6,220,404 B1
(45) Date of Patent: Apr. 24, 2001

(54) NON-ASBESTOS DISC BRAKE PAD FOR AUTOMOBILES

(75) Inventors: Yasuhiro Hara, Hitachi; Takeshi Oyama, Ibaraki-ken; Mitsuhiro Inoue, Oyama; Takahiro Mibe, Yamato; Hiroyuki Nakanishi, Fujisawa, all of (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 09/307,781

(22) Filed: May 10, 1999

(30) Foreign Application Priority Data

May 18, 1998 (JP) .................................................. 10-135190
Jun. 23, 1998 (JP) .................................................. 10-175459

(51) Int. Cl.$^7$ ........................................................ F16D 69/00
(52) U.S. Cl. ........................................ 188/251 A; 428/446
(58) Field of Search .......................... 188/251 A, 250 R, 188/264 E; 524/14, 15; 502/64, 67, 60; 428/323, 429, 446, 447

(56) References Cited

U.S. PATENT DOCUMENTS

| | | | |
|---|---|---|---|
| 5,078,909 | * | 1/1992 | Shigeta et al. .................... 524/423 |
| 5,344,899 | * | 9/1994 | Enomoto et al. ................. 525/534 |
| 5,387,564 | * | 2/1995 | Takeuchi et al. ................. 502/62 |
| 5,563,196 | | 10/1996 | Kitahara et al. . |
| 6,027,708 | * | 2/2000 | Rayalu et al. .................... 423/712 |

FOREIGN PATENT DOCUMENTS

| | | |
|---|---|---|
| 0807766A1 | 11/1997 | (EP) . |
| 49-21544 | * 2/1974 | (JP) . |
| 2-132175 | * 5/1990 | (JP) . |

OTHER PUBLICATIONS

Junkatsu, vol. 19., No. 9, pp. 625–631, 1974.*
Database WPI, Section Ch., Week 9807, AN98–075487, Jun. 10, 1997 (Abstract of RU 2081133).
Database WPI, Section Ch., Week 8931, AN89–223360, Jun. 21, 1989 (Abstract of JP 01–158238).
Database WPI, Section Ch., Week 9087, AN98–075484, Jun. 10, 1997 (Abstract of RU 2081129).

* cited by examiner

*Primary Examiner*—Robert J. Oberleitner
*Assistant Examiner*—Pamela J. Rodriguez
(74) *Attorney, Agent, or Firm*—Antonelli, Terry, Stout & Kraus, LLP

(57) ABSTRACT

A disc brake pad obtained by using a composition comprising a fibrous base material except for asbestos, a binder and a friction adjusting agent, wherein a silicone modified resin is contained as a part or whole of the binder and zeolite is contained as a part of the friction adjusting agent can prevent a transfer film from contacting with water or remove the water once adsorbed in the transfer film and can lower the sound pressure of creep groan.

9 Claims, 2 Drawing Sheets

NON-ASBESTOS DISC BRAKE PAD FOR AUTOMOBILES

BACKGROUND OF THE INVENTION

This invention relates to a non-asbestos disc brake pad for automobiles (hereinafter referred to as "disc brake pad").

As a braking system for automobiles, there are used disc brakes, in which a disc brake pad is used as a braking part.

Some known disc brake pads use asbestos (e.g. JP-A 49-21544, Junkatsu vol. 19, no. 9, p. 625–631 (1974)). In contrast, JP-A 2-132175 discloses a non-asbestos friction material which is a mixture comprising a fibrous base material such as metal fibers, inorganic fibers and organic fibers; a binder including a thermosetting resin such as a phenol resin; and as a friction adjusting agent a lubricant such as graphite, antimony trisulfide, etc, a powder of metal such as iron, copper, brass, etc., a filler such as barium sulfate, calcium carbonate, etc. and/or an organic friction adjusting agent such as cashew dust, acrylonitrile-butadiene rubber (NBR), styrene-butadiene rubber (SBR), etc. Such a mixture is subjected to molding with heating under pressure to give a disc brake pad.

But automobiles using these prior art disc brake pads generate a noise which is so-called "creep groan". This noise seems to be derived from the generation of stick slip vibration when a creep torque of an automatic transmission is applied to a disc brake, said stick slip vibration being resonated to produce a noise. The frequency of this noise is usually about 200 to 300 Hz. When a car is driven again after parking the car for a long period of time, particularly after parking (allowing to stand) the car overnight with a large change in temperature and/or humidity, the phenomenon of the creep groan occurs abruptly with a large amount at an initial stage of driving, which makes a driver uneasy and unpleasant.

BRIEF SUMMARY OF THE INVENTION

It is an object of the present invention to provide a disc brake pad capable of lowering a sound pressure of the creep groan by preventing a transfer film, which is obtained by attaching a part of the disc brake pad to oppositely placing disc rotor when braked, from water, or removing the water once adsorbed from the transfer film.

The present invention provides a disc brake pad for automobiles obtained by using a composition comprising a fibrous base material except for asbestos, a binder and a friction adjusting agent, wherein a silicone modified resin is contained as a part or whole of the binder, and zeolite is contained as a part of the friction adjusting agent.

DETAILED DESCRIPTION OF THE INVENTION

The present inventors have studied earnestly causes for generating creep groan of cars using prior art disc brake pads and found the following facts.

A main cause for generating the creep groan seems to be that when a car is parked overnight, a transfer film formed on a disc rotor surface adsorbs water, which generate rust between the disc rotor and the transfer film; and when the car is driven again, the transfer film is peeled off at the initial time of driving, resulting in increasing the noise level of the creep groan.

Thus, the present inventors prepared disc brake pads from the friction material having a composition as shown in Table 1 and subjected to various tests.

TABLE 1

| Material | Proportion (vol. %) |
|---|---|
| Phenol resin | 20 |
| Aramid fibers | 10 |
| Alumina · silica fibers | 5 |
| Potassium titanate fibers | 15 |
| Copper fibers | 5 |
| Graphite | 3 |
| Antimony trisulfide | 2 |
| Cashew dust | 15 |
| Isoprene rubber powder | 5 |
| Barium sulfate | 20 |

Figure 1:
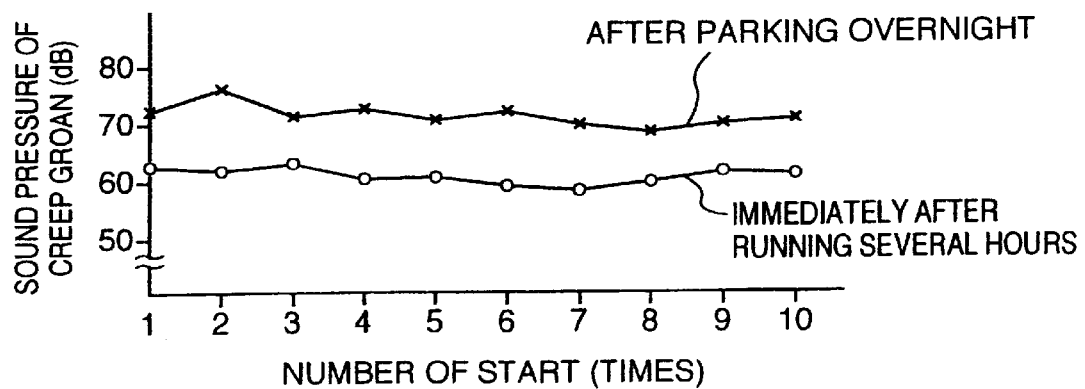
FIG. 1 is a graph showing a relationship between the number of start and the sound pressure of creep groan of a car equipped with a prior art disc brake pad after parking overnight and immediately after running several hours.

FIG. 1 is a graph showing a relationship between the number of start and the sound pressure of creep groan. More in detail, a car parking overnight, and a car immediately after running for several hours (i.e. after braking 200 times with a temperature before braking of 130° C., initial speed at braking of 60 km/hr, and brake deceleration of 0.3 G), respectively, are started slowly while relaxing a brake pedal, then stopped, and started slowly again while relaxing the brake pedal, and repeating this step 10 times, while measuring the sound pressure of creep groan generated at the time of relaxing the brake pedal using a sound-level meter.

As shown in FIG. 1, the car after parking overnight shows the highest sound pressure of 75 dB at the second start. On the other hand, the car immediately after running several hours shows the sound pressure of as low as 63 dB at the maximum sound pressure of creep groan.

The source of generation of the creep groan seems to be the stick slip vibration at the disc rotor sliding surface at the start of the vehicle. Then, the present inventors measured the torque variation (a difference between static coefficient of friction and dynamic coefficient of friction) using test pieces of disc brake pads at the sliding surface of a disc rotor adsorbing water after parking overnight, and at the sliding surface of a disc rotor immediately after running several hours. The results are shown in FIGS. 2 and 3.

Figure 2:
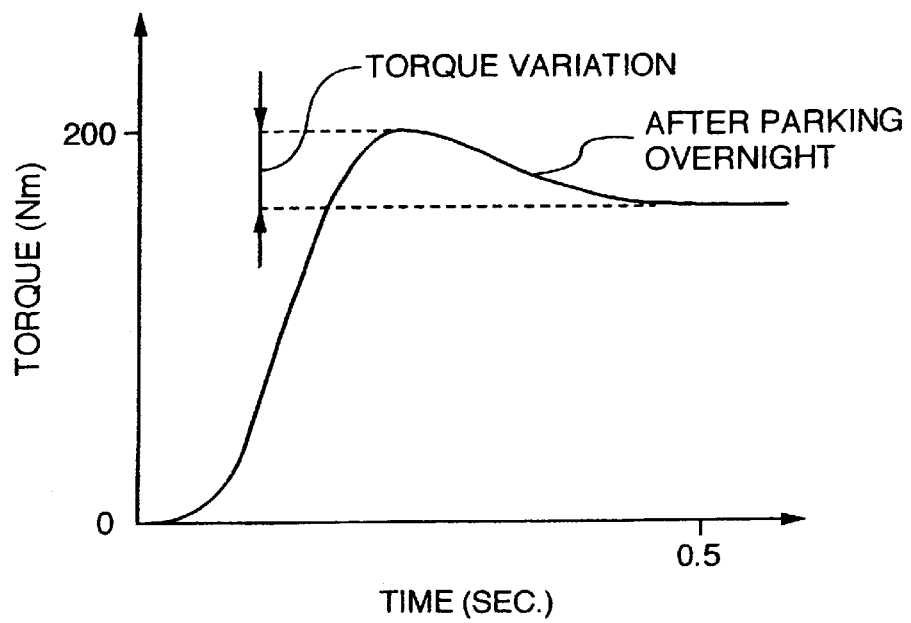
FIG. 2 is a graph showing the results of measuring torque variation using a test piece of the prior art disc brake pad at a sliding surface of disc rotor adsorbing water after parking overnight.
Figure 3:
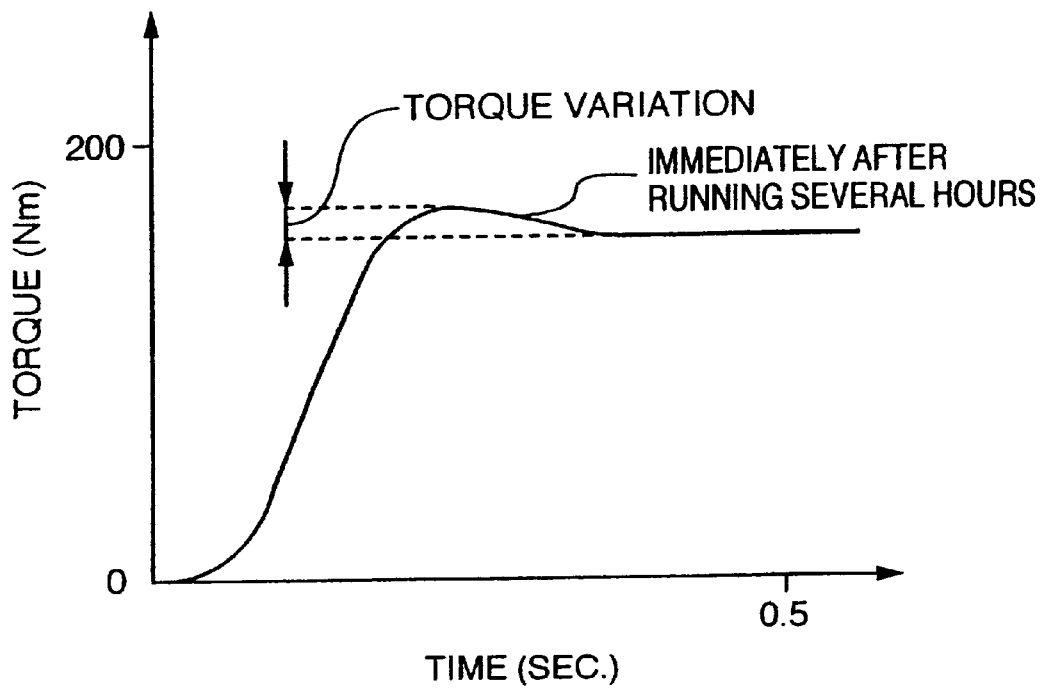
FIG. 3 is a graph showing the results of measuring torque variation using a test piece of the prior art disc brake pad at a sliding surface of disc rotor adsorbing water immediately after running several hours.

As is clear from FIGS. 2 and 3, the disc rotor sliding surface of the car after parking overnight becomes to have a larger torque variation due to adsorption of water, resulting in generating the stick slip vibration. Further, on the sliding surface of disc rotor of the car after parking overnight and adsorbing water, a large number of fine rust was observed. In contrast, the disc rotor sliding surface of the car immediately after running several hours showed a little torque variation.

After studying earnestly taking the results mentioned above into consideration, the present inventors found that in order to prevent the transfer film from adsorbing water or to remove the water once adsorbed in the transfer film, it was effective to use a silicone modified resin as a part or whole of the binder and zeolite as a part of the friction adjusting agent. By doing this, it was possible to provide a disc brake pad capable of lowering the sound pressure of creep groan. Thus, the present invention has been accomplished.

The disc brake pad for automobiles of the present invention is obtained by using a composition comprising a fibrous base material except for asbestos, a binder and a friction adjusting agent, wherein a silicone modified resin is contained as a part or whole of the binder, and zeolite is contained as a part of the friction adjusting agent.

In the disc brake pad of the present invention, when the silicone modified resin is contained in the composition in an amount of 3 to 30% by volume, the resulting disc brake pad is excellent in thermal fade phenomenon.

When the silicone modified resin is obtained by reacting silicone oil or silicone rubber with a novolak phenol resin, or obtained by finely dispersing silicone oil or silicone rubber in a novolak phenol resin, moldability of the disc brake pad is further improved.

Further, when zeolite having a moisture absorption rate of 5% or more is used, the resulting disc brake pad is improved in removing the water once adsorbed.

In addition, when zeolite is contained in the composition in an amount of 0.5 to 20% by volume, the resulting disc brake pad is remarkably effective for preventing the generation of brake noise such as so-called brake squeal with about 2000 to 10,000 Hz.

Moreover, when zeolite having an average particle size of 1 to 50 $\mu$m is used in the composition, the resulting disc brake pad is improved in removing the water once adsorbed.

In the present invention, conventional binders can be used and there is no particular limitation thereto. but, by using the silicone modified resin as a part or whole of the binder, water repellency is by far preferably improved. As the silicone modified resin, it is preferable to use a resin obtained by reacting silicone oil or silicone rubber with a novolak phenol resin, or a resin obtained by finely dispersing silicone oil or silicone rubber in a novolak phenol resin. The amount of the silicone modified resin in the composition is in an amount of preferably 3 to 30% by volume, more preferably 10 to 25% by volume.

In order to react the silicone oil or silicone rubber with the novolak phenol resin, it is sufficient to add silicone oil or silicone rubber to heated novolak phenol resin and to mix well so as to react each other according to a conventional method. Further, in order to finely disperse the silicone oil or silicone rubber in the novolak phenol resin, it is sufficient to add the silicone oil or silicone rubber to the novolak phenol resin, followed by stirring the mixture so as not to react each other, or even if reacted in a very slight amount.

As a part of the friction adjusting agent, zeolite should be used in the present invention in order to improve water removing properties. As the zeolite, either synthetic or natural zeolite can be used. The water absorption rate of the zeolite is preferably 5% or more, more preferably 12% or more.

The water absorption rate of the zeolite is obtained as follows. Zeolite heat treated at 600° C. for 1 hour is allowed to stand under standard conditions (at 21° C. and a relative humidity of 65%) until the temperature of the zeolite becomes 50° C. or less, followed by measurement of the weight (A) simultaneously. After measuring, the zeolite is allowed to stand at 50° C. and a relative humidity of 90% for 6 hours, followed by measurement of the weight (B). The water absorption rate is obtained from the following equation:

Water absorption rate (%)=[(B)−(A)]/(A)×100

The amount of the zeolite in the composition is preferably 0.5 to 20% by volume, more preferably 2 to 10% by volume.

There is no particular limit to the shape of zeolite, but it is preferable to have an average particle size of 1 to 50 $\mu$m, more preferably 1 to 10 $\mu$m.

As the fibrous base material, there can be used any fibers except for asbestos. Examples of the fibrous base material are organic fibers such as aramide fibers, acrylic fibers, phenol fibers, etc.; inorganic fibers such as glass fibers, ceramic fibers, rock wool, potassium titanate fibers, etc.; and metal fibers such as steel fibers, copper fibers, brass fibers, bronze fibers, etc. These fibers can be used alone or as a mixture thereof.

The amount of the fibrous base material in the composition is preferably 20 to 50% by volume, more preferably 25 to 45% by volume.

As the binder, there can be used a polyimide resin, a furan resin, etc. in addition to the silicone modified resin. The amount of the additional binder component in the composition is 10 to 30% by volume, more preferably 15 to 25% by volume.

As the friction adjusting agent, there can be used, in addition to the zeolite, inorganic friction adjusting agents such as graphite, antimony trisulfide, molybdenum disulfide, barium sulfate, potassium carbonate, magnesium carbonate, etc.; organic friction adjusting agents such as cathew dust, acrylic rubber, isoprene rubber, NBR, SBR, etc.; metal powders such as iron powder, brass powder, tin powder, zinc powder, etc.; and grinding materials such as mica, alumina, silica, zircon, mullite, talc, clay, etc. These friction adjusting agents can be used alone or as a mixture thereof.

Total amount of the friction adjusting agents in the composition is preferably 20 to 70% by volume, more preferably 35 to 55% by volume.

The components mentioned above are blended so as to make the total composition 100% by volume.

In the present invention, the percent by volume of each component is obtained by dividing the weight of the component by the density of the component.

The disc brake pad of the present invention can be obtained by uniformly mixing the composition comprising a fibrous base material except for asbestos (preferably 20 to 50% by volume), a binder (preferably 10 to 30% by volume), and a friction adjusting agent (preferably 20 to 70% by volume), a total being 100% by volume, preforming the mixed composition, inserting a back metal and the preformed composition into a mold, molding under pressure with heating, and heat treating the molded article. The heating temperature at the molding is preferably 130 to 170° C., more preferably 140 to 160° C. The pressure at the molding is preferably 20 to 60 MPa, more preferably 30 to 50 MPa. The temperature at the heat treatment is preferably 100 to 300° C., more preferably 150 to 250° C.

The present invention is illustrated by way of the following Examples.

EXAMPLE 1, COMPARATIVE EXAMPLE 1

Components shown in Table 2 were mixed uniformly in a mixer, followed by preform. Each preformed composition was placed in a mold together with a back metal and molded at 140° C. under a pressure of 40 MPa for 10 minutes, followed by heat treatment at 200° C. for 6 hours to give a disc brake pad. In Table 2, as the silicone modified resin, a resin obtained by reaction silicone rubber with novolak phenol resin (RS 2210MB, a trade name, mfd. by Mitsui Chemicals, Inc.) was used. As the zeolite, synthetic zeolite having a water (moisture) absorption rate of 9% and an average particle size of 2 μm was used.

TABLE 2

| | | Example 1 | Comparative Example 1 |
|---|---|---|---|
| Binder | Silicone modified resin | 20 | 20 |
| Fibrous base material | Aramide fibers*1 | 10 | 10 |
| | Alumina Silica fibers | 5 | 5 |
| | Potassium titanate fibers | 15 | 15 |
| | Copper fibers | 5 | 5 |
| Friction adjust-agent | Graphite*2 | 3 | 3 |
| | Antimony trisulfide | 2 | 2 |
| | Cashew dust | 15 | 15 |
| | Isoprene rubber powders | 5 | 5 |
| | Barium sulfate | 15 | 15 |
| | Zeolite | 5 | 0 |

Note)
*1 Kevlar fibers mfd. by DuPont-Toray Co., Ltd.
*2 CB 150, trade name, mfd. by Nippon Graphite Industries, Ltd.

The disc brake pad of Example 1 and that of Comparative Example 1 were built in each car and subjected to a test for measuring a sound level of creep groan after parking (standing) overnight. The creep groan was evaluated by starting each car slowly while relaxing the brake pedal, stopping the car, and then starting the car again slowly while relaxing the brake pedal, repeating this step 10 times, while measuring the sound pressure of creep groan generated at the time of relaxing the brake pedal using a sound-level meter.

As a result, the disc brake pad of Example 1 showed as low as 68 dB at maximum, while the disc brake pad of Comparative Example 1 showed as high as 72 dB at maximum.

Then, the torque variation of a test piece of the disc brake pad of Example 1 at a disc rotor sliding surface adsorbing water after parking overnight was measured and compared with that of Comparative Example 1.

As a result, the torque variation at the disc rotor sliding surface using the disc brake pad of Example 1 was as small as 23 Nm, while the torque variation of the disc brake pad of Comparative Example 1 was as high as 35 Nm.

COMPARATIVE EXAMPLE 2

A disc brake pad was produced in the same manner as described in Example 1 using the composition as shown in Table 3.

TABLE 3

| Material | Proportion (Vol. %) |
|---|---|
| Phenol resin | 20 |
| Aramide fibers | 10 |
| Alumina · silica fibers | 5 |
| Potassium titanate fibers | 15 |
| Copper fibers | 5 |
| Graphite | 3 |
| Antimony trisulfide | 2 |
| Cashew dust | 15 |

TABLE 3-continued

| Material | Proportion (Vol. %) |
|---|---|
| Isoprene rubber powder | 5 |
| Barium sulfate | 15 |
| Zeolite | 5 |

The resulting disc brake pad was built in a car and subjected to measurement of the sound pressure of creep groan in the same manner as described in Example 1. Further, the torque variation of the disc brake pad at the disc rotor sliding surface adsorbing water after parking overnight was as large as 35 Nm.

The data (10 times) of sound pressure of creep groan of the disc brake pads of Example 1, Comparative Example 1 and Comparative Example 2 are shown in Table 4.

TABLE 4

| | Example 1 | Comparative Example 1 | Comparative Example 2 |
|---|---|---|---|
| Sound pressure of creep groan (dB) | 67 | 71 | 72 |
| | 68 | 72 | 71 |
| | 68 | 72 | 72 |
| | 68 | 72 | 71 |
| | 68 | 72 | 71 |
| | 67 | 71 | 69 |
| | 67 | 71 | 69 |
| | 66 | 70 | 69 |
| | 66 | 69 | 68 |
| | 66 | 69 | 68 |
| Maximum (dB) | 68 | 72 | 72 |

Figure 4:
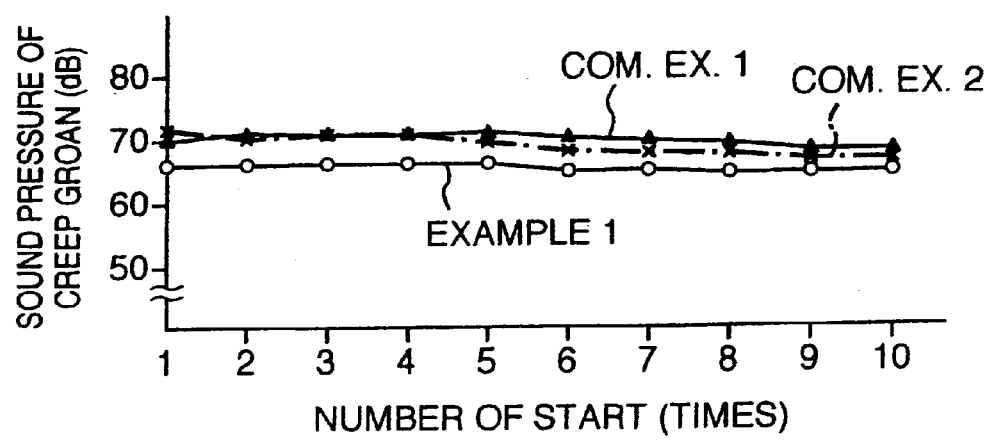
FIG. 4 is a graph showing a relationship between the number of start and the sound pressure of creep groan of cars equipped with the disc brake pads obtained in Example 1 and Comparative Examples 1 and 2 after parking overnight.

The results of Table 4 are shown in FIG. 4.

As is clear from FIG. 4, the disc brake pad of the present invention is improved so as to lower the sound pressure of creep groan and make the torque variation small.

As mentioned above, the disc brake pad of the present invention obtained from the composition wherein the silicone modified resin is used as a part or whole of the binder, and zeolite is used as a part of the friction adjusting agent, is effective for preventing the transfer film from contacting with water, or for removing the water once adsorbed in the transfer film so as to lower the sound pressure of creep groan. Thus, the disc brake pad of the present invention is very suitable for use industrially.

Further, the disc brake pad of the present invention obtained from the composition containing 3 to 30% by volume of silicone modified resin is excellent in thermal fade phenomenon in addition to the above-mentioned features.

In addition, the disc brake pad of the present invention obtained from the composition wherein as the silicone modified resin a resin obtained by reacting silicone oil or silicone rubber with a novolak phenol resin, or obtained by finely dispersing silicone oil or silicone rubber in a novolak phenol resin, shows the features mentioned above with excellent molding properties.

Moreover, the disc brake pad of the present invention obtained from the composition containing zeolite having a water (moisture) absorption rate of 5% or more is excellent in removing water in addition to the features mentioned above.

The disc brake pad of the present invention obtained from the composition containing 0.5 to 20% by volume of zeolite is remarkably effective for preventing the generation of brake noise such as so-called brake squeal of about 2000 to 10,000 Hz in addition to the features mentioned above.

The disc brake pad of the present invention obtained from the composition containing zeolite having an average particle size of 1 to 50 μm is excellent in removing water in addition to the features mentioned above.

What is claimed is:

1. A disc brake pad for automobiles, which is a disc brake pad obtained by molding a uniformly mixed composition comprising a fibrous base material except for asbestos, a binder and a friction adjusting agent, in a mold under pressure with heating, said composition having previously been preformed, wherein a silicone modified resin is contained in an amount of 3 to 30% by volume in the total composition as a part or whole of the binder, and zeolite is contained in an amount of 0.5 to 20% by volume in the total composition as a part of the friction adjusting agent.

2. A disc brake pad according to claim 1, wherein the silicone modified resin is obtained by reacting silicone oil or silicone rubber with a novolak phenol resin.

3. A disc brake pad according to claim 2, wherein the amount of the silicone modified resin in the composition is 10–25% by volume.

4. A disc brake pad according to claim 1, wherein the silicone modified resin is obtained by finely dispersing silicone oil or silicone rubber in a novolak phenol resin.

5. A disc brake pad according to claim 1, wherein zeolite has a moisture absorption rate of 5% or more.

6. A disc brake pad according to claim 1 or 5, wherein zeolite has an average particle size of 1 to 50 μm.

7. A disc brake according to claim 1, wherein said disc brake pad consists essentially of said composition.

8. A disc brake pad according to claim 1, wherein said disc brake pad consists of said composition.

9. A disc brake pad according to claim 1, wherein the zeolite has a moisture absorption rate of at least 12%.

* * * * *

UNITED STATES PATENT AND TRADEMARK OFFICE
CERTIFICATE OF CORRECTION

PATENT NO.    : 6,220,404 B1
DATED         : April 24, 2001
INVENTOR(S)   : Hasuhiro Hara et al.

Page 1 of 1

It is certified that error appears in the above-identified patent and that said Letters Patent is hereby corrected as shown below:

Title page,
Item [73] Assignee(s), replace "Hitachi Chemical Company, Ltd., Tokyo (JP)" with
-- Hitachi Chemical Company, Ltd., Tokyo (JP); and Nissan Motor Co., Ltd., Yokohama (JP) --.

Signed and Sealed this

Twenty-eighth Day of May, 2002

Attest:

Attesting Officer

JAMES E. ROGAN
Director of the United States Patent and Trademark Office